Dec. 29, 1936.    G. J. WINTER    2,066,024
CIRCUIT CLOSING DEVICE
Filed Jan. 11, 1935
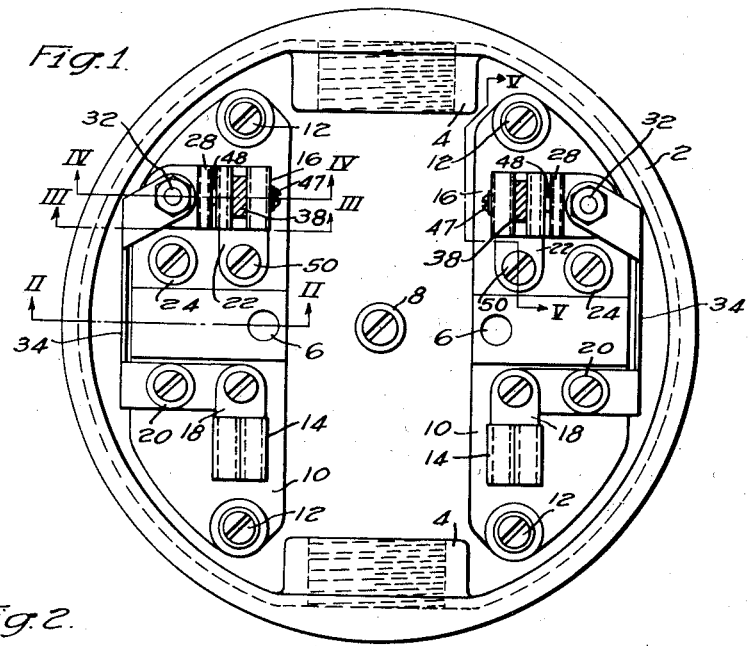
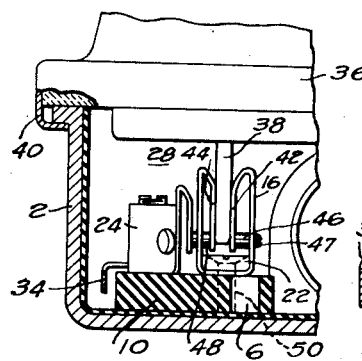
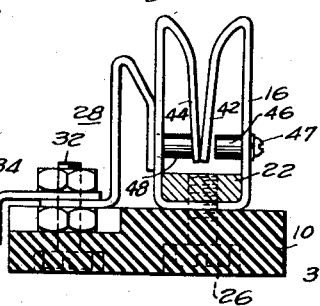
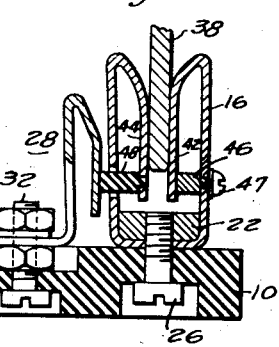
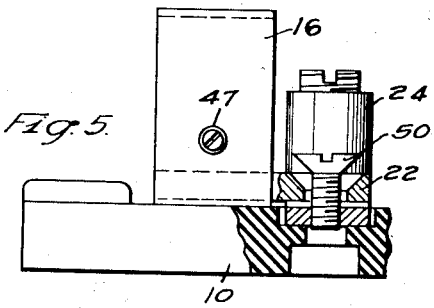
WITNESSES:
E. A. McCloskey
Wm. C. Gromme
INVENTOR
George J. Winter.
BY
Waltzman
ATTORNEY Patented Dec. 29, 1936

2,066,024

UNITED STATES PATENT OFFICE 2,066,024

CIRCUIT CLOSING DEVICE

George J. Winter, Kearny, N. J., assignor to Westinghouse Electric & Manufacturing Company, East Pittsburgh, Pa., a corporation of Pennsylvania Application January 11, 1935, Serial No. 1,268

4 Claims. (Cl. 200—2)

The present invention relates to electrical meters and more specifically contemplates an improved mounting base including a novel terminal block arrangement for mounting such meters.

The modern type of watthour meter includes a casing for enclosing the meter element and a plurality of contact blades projecting from the base of such casing. The meter is adapted to be mounted upon a terminal chamber or sub-base in which are disposed a plurality of contact jaws for receiving the meter contact blades when the meter is in operative position. This general type of construction is shown in Patent No. 1,969,499, issued August 7, 1934, to W. M. Bradshaw, et al., and assigned to the Westinghouse Electric & Manufacturing Company.

In meters of the above character, the supply circuit is connected to the load circuit through the meter by the act of placing the meter in position; that is, the meter and its contact blades constitute essentially a switch between the supply and load circuits. When a meter is removed for testing, repairs or other purposes, the load circuit is no longer connected to the supply circuit, resulting in an interruption of the consumer's service.

It is an object of the present invention to provide an auxiliary contact device within the terminal chamber which is effective, when the meter is removed, for establishing a connection between the load and supply circuits to prevent interruption of the consumer's service.

The present invention is an improvement on the construction shown in copending application Serial No. 746,188, filed September 29, 1934, by Walter G. Mylius, and assigned to the Westinghouse Electric & Manufacturing Company.

Referring to the drawing,

Figure 1 is a plan view of a terminal chamber for a meter embodying the present invention;

Fig. 2 is a broken view, partially in section, taken on the line II—II of Fig. 1, and showing a portion of a meter in operative position; and Figs. 3, 4 and 5 are enlarged views in section taken on the lines III—III, IV—IV and V—V, respectively, of Fig. 1.

Referring more particularly to Fig. 1, the invention contemplates a substantially cylindrical chamber 2 constituting a terminal box and having a diameter substantially the same as the base of a meter which it is supposed to support. The chamber 2 is provided with diametrically opposed threaded bosses 4 for receiving electrical conduit fittings accommodating the service and load conductors of an electrical circuit. The chamber 2 may be secured to a support, preferably in the position shown in Fig. 1, by means of screws (not shown) disposed in apertures 6, and a centrally disposed terminal screw 8 may be provided, if desired, for making a ground connection as is sometimes required.

Two terminal blocks 10 are secured within the chamber 2 by means of screws 12, or otherwise. The blocks 10 are of insulating material, preferably of the molded type, and are adapted to support terminal jaws 14 and 16. The jaw 14 of each block is electrically connected through a strap 18 to a termina post 20, and similarly the jaw 16 is electrically connected by means of a strap 22 to a terminal post 24. It is contemplated that the service conductors will enter the chamber 2 through the upper boss 4 and be electrically connected to the terminal posts 24, and the load conductors will be connected to the posts 20 and leave the channel through the lower boss 4.

Each terminal jaw 14 comprises a pair of spring fingers or prongs spaced somewhat less than the thickness of a meter contact blade, so that when the blade is inserted it will move the spring fingers laterally to insure a good electrical contact. The jaws 14 are suitably secured to the blocks 10, such as by having the base of straps 18 extend through the jaws and inserting a screw through the block and base of the jaw into a threaded hole in the strap 18.

The contact jaws 16 all are of substantially the same shape as the jaws 14 and are secured in position, as indicated in Figs. 3 and 4, by a screw 26 extending through the block and the base of the jaw into threaded engagement with the strap 22.

Each of the jaws 16 is provided with an auxiliary contact device comprising (Figs. 2, 3 and 4) a resilient strip normally biased into engagement with the side of the jaw 16; that is, in the position shown in Fig. 3. The strip 28 is maintained in position by a bolt 32 extending through the block 10 which clamps the strip 28 to a conducting strap 34 having the opposite end thereof connected to the terminal post 20 of the jaw 14. Assuming that the meter is not in operative position, the strip will be in the position shown in Fig. 3, and there will be a direct electrical connection or shunt across the terminals 14 and 16 to complete the circuit between the supply and load lines.

Referring to Fig. 2, which diagrammatically illustrates a meter 36, having contact blades 38 projecting from the base thereof and secured to the chamber 2 by a suitable clamping ring 40, it will be noted that as the blade enters the jaw 16, the free ends 42 and 44 of the jaw will be displaced laterally to insure a good electrical and mechanical connection between the blade and jaw. The extent of lateral movement of the free end 42 is limited by the spacing block 46, which may be of conducting or non-conducting material, suitably secured to one leg of the jaw 16. In the construction shown, the spacer 46 is a metallic bushing having a threaded bore for receiving a screw 47 projecting through the leg of the jaw. A lock-washer may be placed under the head of the screw 47 if desired, as shown in the drawing. It will be noted that the bushing 46 permits only a limited movement of the free end 42 of the jaw, thereby causing a substantially greater movement of the free end 44.

A bushing or block 48 of insulating material is secured to the free end 44 of the jaw and is secured thereto, as indicated in Fig. 4, by having a reduced portion of the bushing fitted into a correspondingly sized aperture in the free end 44. The bushing 48 projects freely through an aperture in the leg of the jaw 16 into contact with the strip 28 adjacent the free end thereof. The length of the bushing 48 is such that when the meter blade 38 is withdrawn, the strip 28 electrically and mechanically contacts the face of the jaw 16, and when the blade 38 is inserted into the position shown in Figs. 2 and 4, the bushing 48 forces the strip 28 out of contact with the face of the jaw 16, thereby breaking the electrical connection between the jaws 14 and 16.

Referring to Fig. 5, the connection between a jaw 16 and its terminal post 24 may be controlled by a screw connector 50 which connects the strap 22 with the plate upon which the post 24 is mounted. The construction is such that when the screw 50 is loosened, as in Fig. 5, the plate upon which the terminal post 24 is mounted drops away from the strap 22, as shown, to break the connection, and when the screw 50 is tightened, the plate is drawn into electrical contact with the strap.

It should be apparent from the foregoing that the construction described affords a simple and positive means for controlling the electrical connection between terminals 14 and 16 by taking advantage of the natural resiliency of the free ends 42 and 44 of the jaw 16. As these free ends are displaced by the contact blade 38, the movement of the free end 42 is restricted to thereby cause a greater movement of the free end 44 than would normally occur if the bushing 46 were not provided. The increased movement of the free end 44 insures that the travel of the insulating bushing 48 and consequently the free end of terminal strip 28 will be sufficient to positively break the electrical connection between the strip and the side of the jaw.

In the foregoing, it has been assumed that the conduit connected in the bosses 4 of the chamber 2 extends in a vertical direction. If, however, such conduit must extend horizontally, by reason of the peculiarities of a particular installation, the chamber 2 will have to be rotated 90° from the position shown in Fig. 1 and in such position the contact jaws will also have to be rotated so that they remain in the position shown in Fig. 1. In such position, one set of contacts 14 and 16 will have to be reversed, and instead of the shunt connector 34 being in the position shown, a suitable jumper must be provided between the vertically aligned jaws of the two blocks, instead of the jumper 34 shown herein.

Various modifications may be made in the construction shown without departing from the spirit of the present invention, and it is desired that no limitations shall be placed upon the invention except as imposed by the prior art and set forth in the appended claims.

I claim as my invention:

1. A terminal jaw, for an electric circuit, of the type adapted to receive a contact blade comprising a resilient strip substantially of U-shape having the free ends of the legs thereof return-bent toward each other and spaced less than the thickness of a contact blade so that said ends will be displaced by the blade when it is inserted therebetween, a terminal strip of resilient material biased to engage one of the legs of the jaw, and means secured adjacent to the free end of said leg extending loosely through the leg in engagement with said terminal strip whereby movement of said free end caused by insertion of the contact blade moves the terminal strip out of engagement with the jaw.

2. A terminal jaw, for an electric circuit, of the type adapted to receive a contact blade comprising a resilient strip substantially of U-shape having the free ends of the legs thereof return-bent toward each other and spaced less than the thickness of a contact blade so that said ends will be displaced by the blade when it is inserted therebetween, a terminal strip of resilient material biased to engage one of the legs of the jaw, means secured adjacent to the free end of said leg extending loosely through the leg in engagement with said terminal strip whereby movement of said free end caused by insertion of the contact blade moves the terminal strip out of engagement with the jaw, and means for limiting the movement of the other leg when the blade is inserted.

3. A terminal jaw, for an electric circuit, of the type adapted to receive a contact blade comprising a resilient strip substantially of U-shape having the free ends of the legs thereof return-bent toward each other and spaced less than the thickness of a contact blade so that said ends will be displaced by the blade when it is inserted therebetween, a contact device normally biased to one position, and means secured to the free end of one of said legs and extending loosely through such leg for operating said contact device to another position when the contact blade is inserted in the jaw.

4. A terminal jaw, for an electric circuit, of the type adapted to receive a contact blade comprising a resilient strip substantially of U-shape having the free ends of the legs thereof return-bent toward each other and spaced less than the thickness of a contact blade so that said ends will be displaced by the blade when it is inserted therebetween, a contact device normally biased to one position, and means secured to the free end of one of said legs and extending loosely through such leg for operating said contact device to another position when the contact blade is inserted in the jaw, said last-mentioned means including a member of insulating material to electrically insulate said leg from the contact device.

GEORGE J. WINTER.